March 8, 1966 W. R. SEEGMILLER 3,239,656

ANALOG PULSE-TIME MODULATOR

Filed Nov. 5, 1962 2 Sheets-Sheet 1

Inventor:
Walter R. Seegmiller,
by S. T. Keady
His Agent.

Inventor:
Walter R. Seegmiller,
by D. T. Healy
His Agent.

United States Patent Office 3,239,656
Patented Mar. 8, 1966

3,239,656
ANALOG PULSE-TIME MODULATOR

Walter R. Seegmiller, Schenectady, N.Y., assignor to General Electric Company, a corporation of New York Filed Nov. 5, 1962, Ser. No. 235,306
7 Claims. (Cl. 235—178)

This invention relates to electronic analog computers of the class wherein a variable is represented by the pulse-widths in a train of pulses occurring at a fixed frequency. The invention provides a modulator utilizing novel magnetic amplifier circuitry which converts an analog electrical signal in the form of a variable amplitude voltage or current to a cyclic pulse-width modulated signal at the sampling rate of the system with an accuracy sufficient for analog computer applications or applications requiring similar accuracy. The pulse-width modulator is further characterized by the convenience with which multiplication by a second variable can be concurrently performed.

Electronic analog computers are generally of a form in which a variable is represented by a single continuously variable quantity such as a voltage appearing at a point or points in a system. The overall accuracy of system operation is limited by the accuracy with which the individual quantities can be represented. It is evident that substantial errors in any part of a system tend to be catastrophic for the system as a whole. Present analog computers are frequently dependent upon components such as potentiometers that do not have sufficient reliability because of the effects of mechanical wear, aging and the like which lead to failures, particularly in applications removed from the laboratory requiring extended operating time with minimum maintenance.

Substantial effort has been expended in developing analog devices such as multipliers utilizing only static components and having high accuracy. One of the types of multipliers which has been studied uses pulse-width modulation. Because of the excellent characteristics of switching transistors, the feasibility of such an approach is primarily dependent upon the generation of control signals for the switches having the requisite pulse-width accuracy. Heretofore, efforts to provide apparatus for generating such control signals, which could meet in-service reliability requirement at a practical cost have been unsuccessful.

The reasons for the difficulties are varied. One problem is the instability of active devices required for the circuits. For example, where transistors are required to perform as variable gain devices, changes in the transistor characteristics such as the $\alpha$ parameter, as caused by aging, etc., result in serious operating errors. Another problem is that reference waveform sources such as sawtooth signal generators are subject to variations from numerous causes including variable phase shifts introduced between the generator and the operating circuitry.

Accordingly, it is an object of this invention to provide an accurate pulse-width modulator which does not require either active components or supply sources having accuracies of the same order as required of the modulator as a whole.

It is a further object of the invention to provide a pulse-width modulator utilizing magnetic amplifier components to provide sufficient accuracy for analog computer applications.

It is another object of this invention to provide an accurate pulse-width multiplier having no moving parts and utilizing standard, reliable components.

Briefly stated, in accordance with some aspects of the invention, a pulse-width modulator is provided in which a variable input signal cyclically controls the ON-time of an output solid state switch to produce an output pulse train in which the pulse duration of the individual pulses is proportional to the variable input signal. The pulse-width control signal for the output switch is derived from a magnetic amplifier which is driven by a square wave source at a frequency equal to half the sampling frequency of the system. Input signals are applied to the magnetic amplifier so as to produce the ON-time control signals, each cycle, having a duration proportional to the input signal amplitude. Nonlinearity due to the inherent nonlinear characteristics of saturable reactors is substantially eliminated by degenerative feedback to the amplifier. This feedback is provided by a second switch controlled in parallel with the output switch and a reference voltage source connected in series with the second switch and the amplifier so that the average control signal duration is accurately proportional to the input signal amplitude over a few cycles. To insure fast, reliable switching operation, a threshold element, such as a zener diode, blocks output signals from the magnetic amplifier prior to substantial saturation of the magnetic amplifier.

The features of the invention which are believed to be novel are set forth with particularly to the appended claims. The invention itself, however, both as to its organization and method of operation, together with further objects and advantages thereof, may best be understood by reference to the following description when taken in connection with the drawings; wherein:

Figure 1:
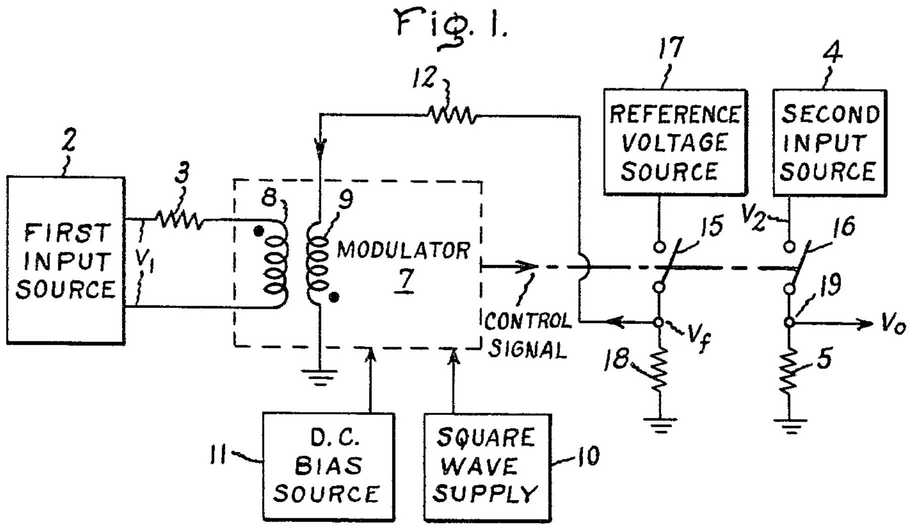
FIGURE 1 is a diagrammatic illustration of the novel pulse-width modulator arranged for multiplication.

Referring now to the drawings, FIGURE 1 is a diagrammatic illustration of a multiplier circuit which incorporates the novel pulse-width modulator to provide what is frequently called a "rectangle" multiplier. Signals representing first and second input variables to be multiplied are supplied by a first input source 2 and a second input source 4 which respectively supply voltages $V_1$ and $V_2$. Pulse-width modulation is provided by a magnetic pulse-time modulator 7 which is preferably a full-wave, single-ended, self-saturating magnetic amplified type. The input to modulator 7 is applied to the magnetic amplifier signal winding 8 from the first input source 2 through resistor 3 so that the input voltage $V_1$ causes a current $I_1$ to flow into signal winding 8 having $N_1$ turns with the proper polarity to increase the "ON-time" of the modulator 7. The magnetic amplifier of modulator 7 is energized by a square-wave supply 10 such as a conventional inverter and is biased to a zero ON-time condition for zero input signal level by a magnetic amplifier D.-C. bias source 11. Modulator 7 provides a control signal such as a current $I_c$ which controls the ON-time of a pair of ganged switches 15 and 16. The output of modulator 7 is therefore connected in parallel to feedback switch 15 and output switch 16 which are preferably switching transistors. The feedback signal is provided by a reference voltage source 17 which is connected to ground through the feedback switch 15 and resistor 18 across which a voltage $V_f$ is developed during the ON-time of the switch. The feedback current is coupled to the feedback winding 9, having $N_f$ turns, of the magnetic pulse-time modulator 7, so that a current $I_f$ flows in the feedback winding. If the feedback signal $I_fN_f$ has high gain the *average* ON-time of the modulator is accurately proportional to the first input signal $V_1$. The output signal $V_o$ is the second variable signal $V_2$ time modulated in accordance with the first variable signal $V_1$.

This multiplication results from the connection of the second variable source 4 to the multiplier output terminal 19 in series with the output switch 16 and load resistor 5.

Figure 2:
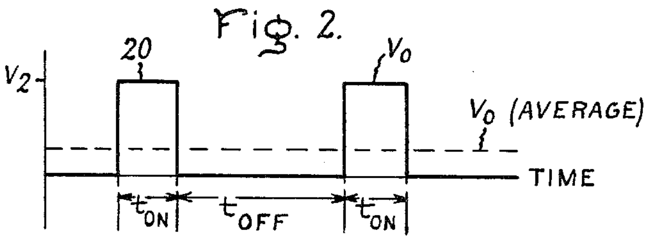
FIGURE 2 illustrates a representative output signal waveform for the FIGURE 1 multiplier.

FIGURE 2 illustrates a representative output voltage waveform 20 of the FIGURE 1 multiplier. With the magnetic amplifier of modulator 7 unsaturated, the output control current is very low and the switching transistors are maintained in an open or nonconducting state between their collector and emitter terminals. However, with the application of a D.-C. input voltage $V_1$ to the input winding 8, the magnetic amplifier reaches saturation before the end of each half cycle of the square wave supply and produces a step increase in the control signal current which switches transistors 15 and 16 to a closed or low impedance condition. Since the D.-C. bias source 11 is adjusted so that the magnetic amplifier of modulator 7 reaches the threshold of saturation for a zero voltage input signal $V_1$, the application of a non-zero input voltage shifts the time at which saturation occurs. This shift is proportional to the input voltage $V_1$. To compensate for the nonlinearity inherent in magnetic amplifiers, a degenerative feedback mode of operation is provided. This is implemented by the feedback switch 15 and the reference voltage source 17 which apply $V_f$ to the magnetic amplifier of modulator 7 in opposition to the input voltage $V_1$. The relationship is such that:

$$V_1(t_{on}+t_{off})=KV_f t_{on}$$

or $$V_1=(KV_f)\frac{t_{on}}{t_{on}+t_{off}} \quad (1)$$

where K is a scale factor constant of the system determined by such factors as the turn ratios and the saturable reactor characteristics. The average of the output voltage $V_0$ derived from the second variable voltage $V_2$, switched synchronously with the reference voltage, is therefore:

$$V_o \text{ (average)}=V_2\frac{t_{on}}{t_{on}+t_{off}} \quad (2)$$

from (1):

$$V_o \text{ (average)}=V_1V_2\frac{1}{KV_f}$$

The multiplier output is accordingly directly proportional to the product of the variable voltages $V_1$ and $V_2$.

Two important characteristics of the magnetic amplifier operation are the utilization of high gain in the internal feedback loop and reliance upon averaging where the averaging time extends over several cycles. Because of these factors, the modulator ON-time is made accurately proportional to the input signal level. Since the reference D.-C. voltage sources and current determining resistors are constant, variations in the average feedback ampere-turns are equivalent to variations in the average ON-time. Also, variations in the average input signal ampere-turns are equivalent to variations in the input signal. A representative feedback gain factor for the modulator is 50. Such a gain factor in this case means that the time integral of the input ampere-turns without feedback is 1/50 the integral of the feedback ampere-turns. Because of this gain factor and because the same saturable reactors are used to compare the signals, variations in the characteristics of the individual components have very small effect on the overall operation.

The accuracy of the modulator remains fundamentally determined by the accuracy with which the average saturation time of the saturable reactors (i.e., the ON-time) is maintained proportional to the input signal level. If one considers an erroneous deviation $\Delta t$ in this saturation time arising from one reactor reaching saturation $\Delta t$ before the proper saturation time, during a given half cycle, because of an increase in the square-wave voltage, for example, this can be given a correspondence to a hypothetical input signal having a higher level by $\Delta V$ and an equivalent variation in ampere-turns. However, during this time deviation $\Delta t$, the feedback signal drives the other saturable reactor in a compensating direction. That is, the second saturable reactor is given an opposing flux change, effective during the next half cycle, which delays saturation and is typically 50 times that of the corresponding hypothetical change $\Delta V$ in input ampere-turns. The circuit values are chosen so that the interaction between the square wave supply and the feedback signal operates to keep the relation of ON-time to D.-C. signal a constant.

Figure 3:
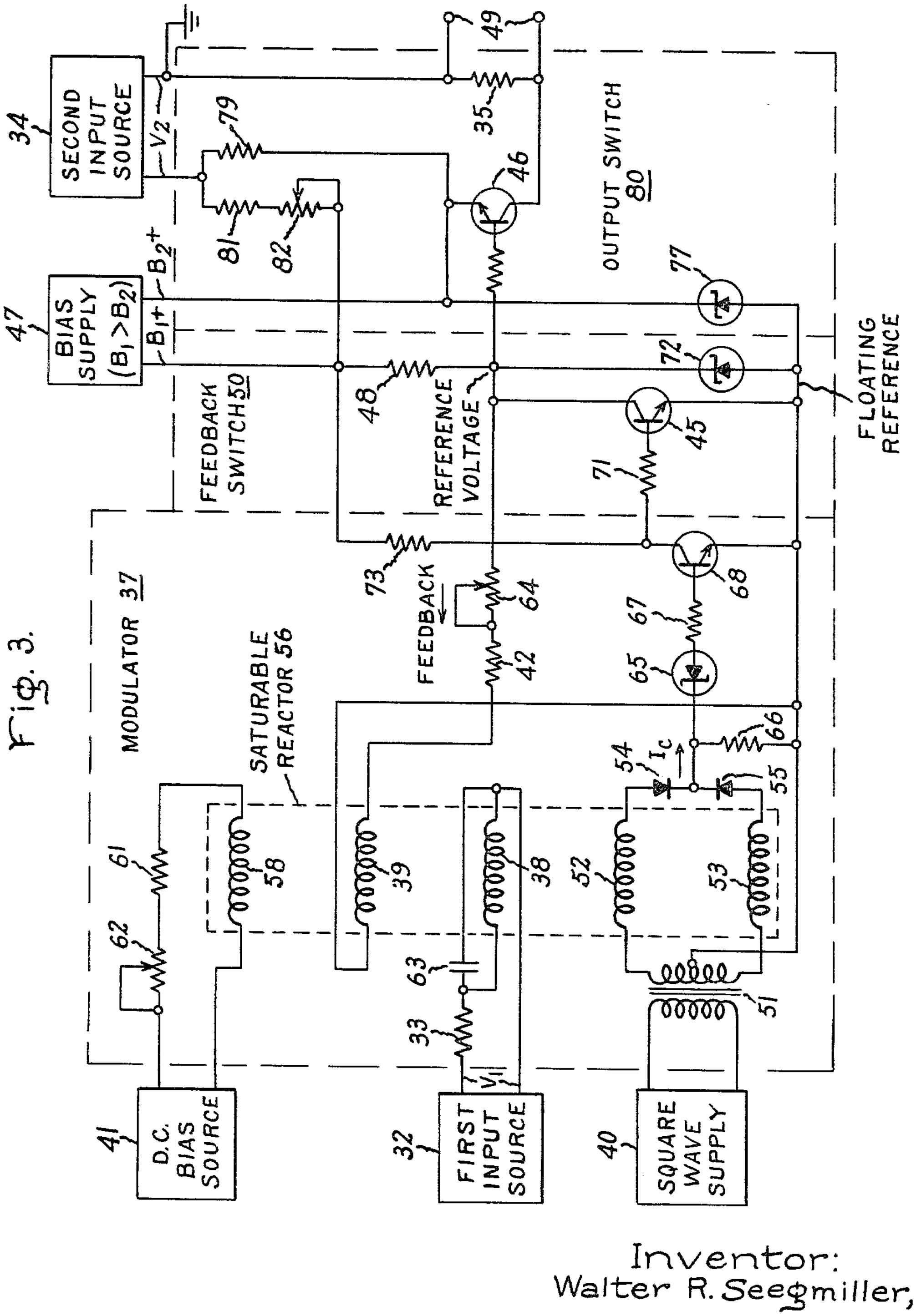
FIGURE 3 is a schematic diagram of a preferred embodiment of the noved pulse-width modulator arranged for multiplication.

FIGURE 3 illustrates a preferred embodiment of the invention for two-quadrant multiplication. A full-wave, single-ended magnetic amplifier in the pulse-width modulator 37 includes conventional components such as saturable reactors 56, output windings 52 and 53 and diodes 54 and 55. A square wave supply source 40 drives the magnetic amplifier of modulator 37 through transformer 51. The output pulse duration of the modulator 37 is determined by the signals applied to the signal windings 38, 39 and 58, all common to saturable reactors 56. A D.-C. bias source 41, through resistor 61 and trimming potentiometer 62, adjusts the modulator 37 to a zero voltage level output for $V_1=0$. The input signal in the form of the voltage $V_1$ from a first input source 32 is connected to winding 38 through resistor 33. The feedback reference voltage $V_f$ is applied to winding 39 through resistor 42 and trimming potentiometer 64. The resistances 61, 62, 33 and 42 determine the relative signal current amplitudes and therefore the relative ampere-turns for given turn ratios of the windings.

The output of modulator 37 is the switching control signal. Because of pre-saturation currents and the initial slow rise time of output pulses, small currents are blocked from the switches by zener diode 65. Before zener diode 65 breaks down, the output of the magnetic amplifier is shunted to ground through resistor 66. The bias on winding 58 is therefore normally adjusted so that zener diodes 65 reaches the threshold of break down at $V_1=0$. When the input signal becomes non-zero, the actual ON-time output control signal for driving the switching transistors is derived from driving transistor 68 which is controlled by the magnetic amplifier through resistor 67 and the zener diode 65.

The switches in the FIGURE 3 circuit are feedback switching transistor 45 and the output switching transistor 46. Switching transistor 45 is normally conducting and transistor 46 normally nonconducting and they are switched during the ON-time of driving transistor 68. The feedback reference voltage $V_f$ is applied to modulator 37 when the switching transistor 45 is nonconducting. The reference voltage level for $V_f$ is determined by the zener diode 72 when the parallel feedback switching transistor 45 is nonconducting. When the switching transistor 45 is in its normal conducting state, $V_f$ is shunted to ground, removing the feedback from the modulator 37.

Bias for the transistors 45, 46 and 68 relative to the floating reference line is provided by bias $B_1^+$ and $B_2^+$ from bias supply 47 as regulated by zener diodes 72 and 77. In the absence of an ON-time control signal, the $B_2^+$ bias, through resistors 73 and 71, forwardly biases the base-to-emitter junction of transistor 45 and reversely biases the base-to-emitter junction of transistor 46. During an ON-time signal from modulator 37, the voltage on the base of transistor 45 drops towards ground and switches it to the nonconducting state. This in turn raises its collector voltage to $V_f$, typically twice $B_2^+$, thereby switching transistor 46 to its conducting state.

The output switching transistor 46 is a bi-polarity series switch connected between the second variable voltage source 34 and output terminals 49. However, when output transistor 46 is conducting, a collector-to-emitter voltage is generated of the order of 30 millivolts. This voltage is compensated for by the resistors 79, 81 and trimming potentiometer 82 which introduce a correction voltage from bias supply 47. Accordingly, transistor 46 is effectively a simple switch in series with the second voltage source 34, modulated by the first input source 32. An output voltage $V_o$ is thereby made available at terminals 49 across resistor 35. As in FIGURE 1:

$$V_o \text{ (average)} = V_1 \cdot V_2 \cdot \left(\frac{1}{KV_f}\right)$$

The implementation of the FIGURE 3 circuit is straight forward. For example, the magnetic amplifier diodes 54 and 55 can be type 1N482A, the transistors 45, 46 and 68 can be type 2N718, and zener diodes 65 and 77 can be types 1N746 and SV5, respectively.

As is evident to one skilled in the art, the FIGURE 3 circuit is subject to substantial modifications which result in the equivalent performance of the required functions. For example, the output switching transistor 46 is arranged to function as a simple series switch. In appropriate applications, a shunt switch could be utilized which was normally conducting but which during the modulator ON-time would be switched to a nonconducting state whereby the output voltage would be applied to the load. In the same vein, the interconnections of the switching transistors is subject to modification. As illustrated, the output switching transistor 46 is effectively controlled by the feedback switching transistor 45. Obviously, these transistors can be arranged to have each driven directly by the output of modulator 37.

Figure 4:
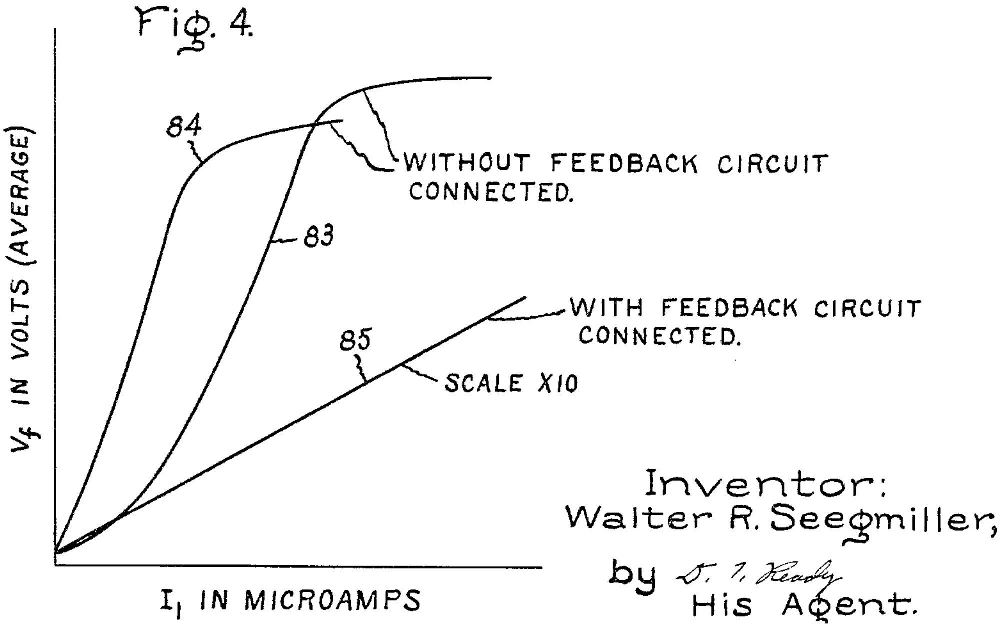
FIGURE 4 is a graph of the magnetic amplifier outputs of the FIGURE 3 modulator illustrating the effects of different energizations and feedback.

FIGURE 4 illustrates graphically the operation of the pulse time modulator 37 in FIGURE 3. Curves 83, 84 and 85 are respectively the feedback voltage output as a function of the input signal currents $I_1$ with normal magnetic amplifier excitation and without feedback, two-thirds normal excitation without feedback and two-thirds excitation with feedback. As is evident, the inherent nonlinearity of the magnetic amplifier results in the nonlinear relationship of the current as seen in curve 83. There can be substantial improvement towards linearity by reducing the normal excitation by one-third which results in the curve 84 response. Worthwhile improvement in linearity is obtained without too great a reduction in the control signal level in the range from one quarter to three quarters of the normal square wave energization for magnetic amplifiers. That is, the energization level which approaches driving the saturable reactors over the full B-H loop characteristic. However, the optimum linearity is obtained with feedback as indicated by curve 85 which is substantially a straight line. The high gain reduces the output level to a degree necessitating the change in scale factor. This high gain produces the linear operation of the modulator for the reasons stated above.

The linearity achieved is suitable for analog electronic computer applications and other analogous applications requiring the same degree of accuracy. The typical requirements for accuracy in this area are in the error range of 0.1 percent to 1 percent of full scale. Of course, under certain circumstances greater accuracy can be obtained with careful design and under certain circumstances lesser accuracy is satisfactory.

The FIGURE 3 circuit operates as a two-quadrant multiplier in that the second variable voltage $V_2$ can assume both positive and negative values which are switched by the transistor 46. The first variable voltage $V_1$ can only assume positive values. To enable four-quadrant multiplication, a second multiplier, substantially the same as the FIGURE 3 circuit, but arranged for negative values for the variable input signal $V_1$, is provided. However, it is necessary to prevent undesirable interactions between the two two-quadrant multipliers. Various modes of compensation include the use of an additional feedback winding on each pulse-time modulator which is connected to the output of the other modulator. The polarity of these feedback windings is arranged so that a signal which turns on one modulator produces enough positive ampere-turns on the other modulator to keep it from giving an erroneous output.

An example of a useful application of multipliers such as the FIGURE 3 circuit is in function generation from power series expansion. For instance, the expansion for the sine function:

$$\sin x = x - \frac{x^3}{3!} + \frac{x^5}{5!} - \cdots \quad (4)$$

can be approximated as:

$$\sin x \cong x - \frac{x^3}{6.77} \quad (5)$$

This approximation is accurate to 1 percent for values of $x$ from 0 to 1.57 radians (90 degrees).

To generate the sine function, two multipliers are cascaded. The output of the first multiplier gives a term proportional to the square of $x$. This output is fed into a second multiplier, where it is multiplied by the original input, to give an output proportional to the cube of $x$. The cubic term is then subtracted from the linear term by mixing the two currents, with the appropriate scale factors, in a meter to give the approximate expression for the sine of $x$.

In function generation and other applications of cascaded multipliers, there is a significant advantage gained from the signal windings of the magnetic pulse-time modulator being isolated by the switching transistors. The output of one multiplier can be fed directly into a second multiplier without intermediate buffer amplifiers. However, to avoid signal loss it is necessary to provide coupling means such as capacitor 63 in FIGURE 3 to filter the pulses.

While particular embodiments of the invention have been shown and described, it is not intended that the invention be limited to such disclosure, but that changes and modifications obvious to those skilled in the art can be made and incorporated within the scope of the claims. For example, the novel pulse-width modulator is of general utility for accurate analog conversions.

What is claimed is:

1. In a pulse-width modulator producing an output signal in the form of a train of recurring pulses in which the individual pulses have a duration determined by the average input signal amplitude, representing a variable quantity, as determined by the ON-time of the modulator comprising:

(a) magnetic amplifier means producing an OFF-time signal in an unsaturated condition and an on ON-time signal in a saturated condition;

(b) switching means controlled by said magnetic amplifier means which are open for the OFF-time condition and closed for the ON-time condition;

(c) input means to apply an electrical signal, representing a variable quantity by a variable average amplitude, to said magnetic amplifier means so as to tend to drive said amplifier means towards saturation; and (d) feedback means, providing a constant amplitude reference signal, coupled to said magnetic amplifier means through said switching means in opposition to the input signal in such a manner that the average ON-time of said switching means is accurately proportional to the amplitude of said input signal.

2. In a pulse-width modulator producing an output signal in the form of a train of pulses occurring at a fixed frequency in which the individual pulses have a duration proportional to the average amplitude of an input signal, representing a variable quantity, as determined by the ON-time of the modulator comprising:

(a) a magnetic amplifier producing an OFF-time signal in an unsaturated condition and an ON-time signal in a saturated condition;
(b) first and second solid state switches controlled by said magnetic amplifier which are open for the OFF-time condition and closed for the ON-time condition;
(c) input means to apply a variable amplitude electrical signal, representing an input variable, to said magnetic amplifier so as to tend to drive said amplifier towards saturation to produce a control signal having a duration proportional to the average input signal amplitude;
(d) a D.-C. reference source coupled to said magnetic amplifier through said first switch to provide a feedback signal in opposition to the input signal in such a manner that the average ON-time of said first and second switches is accurately proportional to the average amplitude of said input signal;
(e) means to apply a square-wave energization signal to said magnetic amplifier; and
(f) output means for applying a second electrical signal to said second switch whereby an output signal pulse train is produced having pulse-widths proportional to the variable signal amplitude.

3. In a pulse-width modulator producing an output in the form of a train of pulses occurring at a fixed frequency in which the individual pulses have a duration proportional to the average amplitude of an input signal, representing a variable quantity, as determined by the ON-time of the modulator comprising:
(a) a magnetic amplifier producing an OFF-time signal in an unsaturated condition and an ON-time signal in a saturated condition;
(b) first and second solid state switches controlled by said magnetic amplifier which are open for the OFF-time condition and closed for the ON-time condition;
(c) input means to apply a variable amplitude electrical signal, representing an input variable, to said magnetic amplifier so as to tend to drive said amplifier towards saturation to produce a control signal having a duration proportional to the average input signal amplitude;
(d) a threshold element, coupled between said magnetic amplifier and said first switch, to block control signals generated before the amplifier is fully saturated;
(e) means to apply a bias signal to said magnetic amplifier which adjusts the amplifier for a continuous OFF-time signal with a zero amplitude input signal;
(f) a D.-C. reference source coupled to said magnetic amplifier through said first switch to provide a feedback signal in opposition to the input signal in such a manner that the average ON-time of said first and second switches is proportional to the average amplitude of said input signal;
(g) means to apply a square-wave energization signal to said magnetic amplifier; and
(h) output means for applying a second electrical signal to said second switch whereby an output signal pulse train is produced having pulse-widths proportional to the variable signal amplitude.

4. The modulator of claim 3 wherein:
(i) said energization means provides a signal at approximately two-thirds the normal magnetic amplifier energization level.

5. In a pulse-width multiplier producing an output signal in the form of a train of recurring pulses in which the individual pulses have a duration determined by a first input signal amplitude, representing a first variable quantity, and have an amplitude proportional to a second input signal:
(a) magnetic amplifier means producing an OFF-time signal in an unsaturated condition and an ON-time signal in a saturated condition;
(b) switching means controlled by said magnetic amplifier means which are open for the OFF-time condition and closed for the ON-time condition and arranged to pulse-width modulate a second variable signal;
(c) input means to apply a first electrical signal, representing a first variable quantity by a variable average amplitude, to said magnetic amplifier means so as to tend to drive said amplifier means towards saturation; and
(d) feedback means, providing a constant amplitude reference signal, coupled to said magnetic amplifier means through said switching means in opposition to the input signal in such a manner that the average ON-time of said switching means is accurately proportional to the amplitude of said input signal.

6. In a pulse-width multiplier producing an output signal in the form of a train of pulses occurring at a fixed frequency in which the individual pulses have a duration proportional to the average amplitude of a first input signal, representing a variable quantity, and have an amplitude proportional to a second input signal comprising:
(a) a magnetic amplifier producing an OFF-time signal in an unsaturated condition and an ON-time signal in a saturated condition;
(b) first and second solid state switches controlled by said magnetic amplifier which are open for the OFF-time condition and closed for the ON-time condition;
(c) input means to apply a first variable amplitude electrical signal, representing a first input variable, to said magnetic amplifier so as to tend to drive said amplifier towards saturation to produce a control signal having a duration proportional to the average first input signal amplitude;
(d) a D.-C. reference source coupled to said magnetic amplifier through said first switch to provide a feedback signal in opposition to the first input signal in such a manner that the average ON-time of said first and second switches is accurately proportional to the average amplitude of said input signal;
(e) means to apply a square-wave energization signal to said magnetic amplifier; and
(f) output means for applying a second variable electrical signal to said second switch whereby an output signal pulse train is produced having pulse-widths proportional to the first variable signal amplitude and an amplitude proportional to the second variable signal.

7. In a pulse-width multiplier producing an output signal in the form of a train of pulses occurring at a fixed frequency in which the individual pulses have a duration proportional to the average amplitude of a first input signal, representing a variable quantity, and have an amplitude proportional to a second input signal comprising:
(a) a magnetic amplifier producing an OFF-time signal in an unsaturated condition and an ON-time signal in a saturated condition;
(b) first and second solid state switches controlled by said magnetic amplifier which are open for the OFF-time condition and closed for the ON-time condition;
(c) input means to apply a first variable amplitude electrical signal, representing a first input variable, to said magnetic amplifier so as to tend to drive said amplifier towards saturation to produce a control signal having a duration proportional to the average first input signal amplitude;
(d) a threshold element, coupled between said magnetic amplifier and said first switch, to block control signals generated before the amplifier is fully saturated;
(e) means to apply a bias signal to said magnetic amplifier which adjusts the amplifier for a continuous OFF-time signal with a zero amplitude first input signal;

(f) a D.-C. reference source coupled to said magnetic amplifier through said first switch to provide a feedback signal in opposition to the input signal in such a manner that the average ON-time of said first and second switches is proportional to the average amplitude of said input signal;

(g) means to apply a square-wave energization signal to said magnetic amplifier; and (h) output means for applying a second variable electrical signal to said second switch whereby an output signal pulse train is produced having pulse-widths proportional to the first variable signal amplitude and an amplitude proportional to second variable signal.

References Cited by the Examiner

UNITED STATES PATENTS 2,808,990 10/1957 Van Allen ---------- 235—178

MALCOLM A. MORRISON, *Primary Examiner.*

A. J. SARLI, *Assistant Examiner.*